US008429416B2

(12) United States Patent
Ooi et al.

(10) Patent No.: US 8,429,416 B2
(45) Date of Patent: *Apr. 23, 2013

(54) METHOD AND APPARATUS OF STORAGE ANTI-PIRACY KEY ENCRYPTION (SAKE) DEVICE TO CONTROL DATA ACCESS FOR NETWORKS

(75) Inventors: Chin Shyan Raymond Ooi, Singapore (SG); Lay Chuan Lim, Singapore (SG); Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 114 days.

This patent is subject to a terminal disclaimer.

(21) Appl. No.: 12/510,970

(22) Filed: Jul. 28, 2009

(65) Prior Publication Data

US 2009/0319798 A1  Dec. 24, 2009

Related U.S. Application Data

(63) Continuation of application No. 11/858,864, filed on Sep. 20, 2007, now Pat. No. 7,600,130, which is a continuation of application No. 10/339,696, filed on Jan. 8, 2003, now Pat. No. 7,353,399.

(30) Foreign Application Priority Data

Jul. 31, 2002  (WO) .......................... PCTSG0200227
Oct. 4, 2002  (WO) .......................... PCTSG0200171

(51) Int. Cl.
*H04L 29/06* (2006.01)
(52) U.S. Cl.
USPC ....................................................... 713/186

(58) Field of Classification Search .................. 713/171, 713/186; 726/9, 27
See application file for complete search history.

(56) References Cited

U.S. PATENT DOCUMENTS 4,853,523 A  8/1989  Talmadge
4,946,276 A  8/1990  Chilcott
(Continued)

FOREIGN PATENT DOCUMENTS

CA  2334113  4/1999
DE  37 06 466  9/1988
(Continued)

OTHER PUBLICATIONS

Aladdin Knowledge Systems, Inc.; MacHUSP USB (advertising material); pp. 29-38.

(Continued)

*Primary Examiner* — Ali Abyaneh
(74) *Attorney, Agent, or Firm* — White & Case LLP

(57) ABSTRACT

A method comprises performing an authentication of a user of a portable device, performing an authentication handshake between the portable device and a content server, wherein the portable device includes a USB plug that plugs directly into a USB port of a host computer and the host computer is communicatively coupled to the content server, and sending a first key sent from the portable device to the content server, wherein access to restricted content on the content server by the user is enabled if the user authentication, the authentication handshake, and an authentication using the first key are all successful. The process may also include encrypting restricted content received from the content server using a private key before storing the restricted content in a non-volatile memory of the portable device.

34 Claims, 11 Drawing Sheets

U.S. PATENT DOCUMENTS

| | | | |
|---|---|---|---|
| 4,988,855 | A | 1/1991 | Iijima |
| 5,282,247 | A | 1/1994 | McLean et al. |
| 5,291,584 | A | 3/1994 | Challa et al. |
| 5,297,148 | A | 3/1994 | Harari et al. |
| 5,357,614 | A | 10/1994 | Pattisam et al. |
| 5,375,243 | A | 12/1994 | Parzych et al. |
| 5,414,425 | A | 5/1995 | Whiting et al. |
| 5,442,704 | A | 8/1995 | Holtey |
| 5,469,564 | A | 11/1995 | Junya |
| 5,485,519 | A | 1/1996 | Weiss |
| 5,490,096 | A | 2/1996 | Seto |
| 5,517,014 | A | 5/1996 | Iijima |
| 5,583,538 | A | 12/1996 | Watanabe et al. |
| 5,588,146 | A | 12/1996 | Leroux |
| 5,621,798 | A | 4/1997 | Aucsmith |
| 5,623,552 | A | 4/1997 | Lane |
| 5,646,646 | A | 7/1997 | Inoue et al. |
| 5,655,077 | A | 8/1997 | Jones et al. |
| 5,659,705 | A | 8/1997 | McNutt et al. |
| 5,663,901 | A | 9/1997 | Wallace et al. |
| 5,684,742 | A | 11/1997 | Bublitz et al. |
| 5,760,986 | A | 6/1998 | Morehouse et al. |
| 5,815,201 | A | 9/1998 | Hashimoto |
| 5,815,252 | A | 9/1998 | Price-Francis |
| 5,815,426 | A | 9/1998 | Jigour et al. |
| 5,844,986 | A | 12/1998 | Davis |
| 5,850,189 | A | 12/1998 | Sakanaka et al. |
| 5,867,802 | A | 2/1999 | Borza |
| 5,890,016 | A | 3/1999 | Tso |
| 5,920,640 | A | 7/1999 | Salatino et al. |
| 5,928,347 | A | 7/1999 | Jones |
| 5,931,791 | A | 8/1999 | Saltzstein |
| 5,935,244 | A | 8/1999 | Swamy et al. |
| 5,938,750 | A | 8/1999 | Shaberman |
| 5,943,603 | A | 8/1999 | Parulski et al. |
| 5,949,882 | A | 9/1999 | Angelo |
| 5,956,415 | A | 9/1999 | McCalley |
| 5,969,750 | A | 10/1999 | Hsieh et al. |
| 5,978,833 | A | 11/1999 | Pashley et al. |
| 6,003,135 | A | 12/1999 | Bialick et al. |
| 6,005,613 | A | 12/1999 | Endsley et al. |
| 6,011,486 | A | 1/2000 | Casey |
| 6,011,741 | A | 1/2000 | Wallace et al. |
| 6,012,103 | A | 1/2000 | Sartore et al. |
| 6,016,476 | A * | 1/2000 | Maes et al. ................ 705/18 |
| 6,016,530 | A | 1/2000 | Auclair et al. |
| 6,016,553 | A | 1/2000 | Schneider et al. |
| 6,027,375 | A | 2/2000 | Wu |
| 6,034,621 | A | 3/2000 | Kaufman |
| 6,038,320 | A | 3/2000 | Miller |
| 6,038,640 | A | 3/2000 | Terme |
| 6,044,428 | A | 3/2000 | Rayabhari |
| 6,047,376 | A | 4/2000 | Hosoe et al. |
| 6,058,441 | A | 5/2000 | Shu |
| 6,061,799 | A * | 5/2000 | Eldridge et al. ............. 726/20 |
| 6,067,625 | A | 5/2000 | Ryu |
| 6,088,755 | A | 7/2000 | Kobayashi et al. |
| 6,088,802 | A * | 7/2000 | Bialick et al. ............... 726/3 |
| 6,105,130 | A | 8/2000 | Wu et al. |
| 6,116,006 | A | 9/2000 | Killen et al. |
| 6,125,192 | A | 9/2000 | Bjorn |
| 6,131,141 | A | 10/2000 | Ravid |
| 6,145,045 | A | 11/2000 | Falik et al. |
| 6,145,046 | A | 11/2000 | Jones |
| 6,145,069 | A | 11/2000 | Dye |
| 6,148,354 | A | 11/2000 | Ban et al. |
| 6,151,069 | A | 11/2000 | Dunton et al. |
| 6,151,657 | A | 11/2000 | Sun et al. |
| 6,178,508 | B1 | 1/2001 | Kaufman |
| 6,182,162 | B1 | 1/2001 | Estakhri et al. |
| 6,199,122 | B1 | 3/2001 | Kobayashi |
| 6,219,439 | B1 | 4/2001 | Burger |
| 6,286,087 | B1 | 9/2001 | Ito et al. |
| 6,300,976 | B1 | 10/2001 | Fukuoka |
| 6,304,898 | B1 | 10/2001 | Shiigi |
| 6,324,537 | B1 | 11/2001 | Moran |
| 6,330,624 | B1 | 12/2001 | Cromer et al. |
| 6,330,648 | B1 | 12/2001 | Wambach et al. |
| 6,351,093 | B1 | 2/2002 | Kato et al. |
| 6,351,810 | B2 | 2/2002 | Gupta |
| 6,361,369 | B1 | 3/2002 | Kondo et al. |
| 6,370,603 | B1 | 4/2002 | Silverman et al. |
| 6,371,376 | B1 * | 4/2002 | Dan ........................... 235/486 |
| 6,385,667 | B1 | 5/2002 | Estakhri et al. |
| 6,385,677 | B1 | 5/2002 | Yao |
| 6,446,118 | B1 | 9/2002 | Gottlieb |
| 6,457,099 | B1 | 9/2002 | Gilbert |
| 6,477,206 | B1 | 11/2002 | Chatani |
| 6,490,163 | B1 | 12/2002 | Pua et al. |
| 6,577,337 | B1 | 6/2003 | Kang |
| 6,618,806 | B1 | 9/2003 | Brown et al. |
| 6,618,807 | B1 | 9/2003 | Wang et al. |
| 6,628,325 | B1 | 9/2003 | Steinberg et al. |
| 6,636,973 | B1 | 10/2003 | Novoa et al. |
| 6,671,808 | B1 | 12/2003 | Abbott et al. |
| 6,725,382 | B1 | 4/2004 | Thompson et al. |
| 6,732,278 | B2 * | 5/2004 | Baird et al. ................... 726/7 |
| 6,748,541 | B1 | 6/2004 | Margalit et al. |
| 6,753,921 | B1 | 6/2004 | Shimizu |
| 6,763,182 | B1 | 7/2004 | Endo et al. |
| 6,763,399 | B2 | 7/2004 | Margalit et al. |
| 6,766,456 | B1 | 7/2004 | McKeeth |
| 6,786,417 | B1 | 9/2004 | Kondo et al. |
| 6,799,275 | B1 | 9/2004 | Bjorn |
| 6,829,672 | B1 | 12/2004 | Deng et al. |
| 6,848,045 | B2 | 1/2005 | Long et al. |
| 6,880,054 | B2 | 4/2005 | Cheng et al. |
| 6,970,183 | B1 | 11/2005 | Monroe |
| 6,976,075 | B2 | 12/2005 | Ma |
| 6,986,030 | B2 * | 1/2006 | Shmueli et al. ................ 713/1 |
| 6,992,721 | B1 | 1/2006 | Kambayashi et al. |
| 7,016,496 | B2 * | 3/2006 | Koch ........................... 380/239 |
| 7,036,738 | B1 * | 5/2006 | Vanzini et al. ............... 235/486 |
| 7,039,759 | B2 | 5/2006 | Cheng et al. |
| 7,058,180 | B2 * | 6/2006 | Ferchichi et al. ............. 380/247 |
| 7,111,324 | B2 | 9/2006 | Elteto |
| 7,356,705 | B2 * | 4/2008 | Ting ........................... 713/186 |
| 2001/0009439 | A1 | 7/2001 | Hwang |
| 2001/0016845 | A1 | 8/2001 | Tribbensee |
| 2001/0029583 | A1 | 10/2001 | Palatov et al. |
| 2001/0030827 | A1 | 10/2001 | Morohashi |
| 2001/0047441 | A1 | 11/2001 | Robertson |
| 2001/0048409 | A1 | 12/2001 | Kim |
| 2001/0052541 | A1 | 12/2001 | Kang et al. |
| 2002/0010857 | A1 | 1/2002 | Karthik et al. |
| 2002/0029343 | A1 | 3/2002 | Kurita et al. |
| 2002/0065083 | A1 | 5/2002 | Patel |
| 2002/0069237 | A1 | 6/2002 | Ehara |
| 2002/0073234 | A1 | 6/2002 | Ma et al. |
| 2002/0106933 | A1 | 8/2002 | Lee |
| 2002/0107046 | A1 | 8/2002 | Davis |
| 2002/0116565 | A1 | 8/2002 | Wang et al. |
| 2002/0131397 | A1 | 9/2002 | Patel et al. |
| 2002/0145507 | A1 | 10/2002 | Foster |
| 2002/0147882 | A1 | 10/2002 | Pua et al. |
| 2002/0151216 | A1 | 10/2002 | Wei |
| 2002/0167546 | A1 | 11/2002 | Kimbell et al. |
| 2002/0174287 | A1 | 11/2002 | Cheng |
| 2002/0194414 | A1 | 12/2002 | Bateman et al. |
| 2003/0063196 | A1 | 4/2003 | Palatov et al. |
| 2003/0103369 | A1 | 6/2003 | Wu |
| 2003/0110371 | A1 | 6/2003 | Yang et al. |
| 2003/0115415 | A1 | 6/2003 | Want et al. |
| 2003/0122839 | A1 | 7/2003 | Matraszek |
| 2003/0157959 | A1 | 8/2003 | Makela et al. |
| 2003/0163634 | A1 | 8/2003 | Kim |
| 2004/0025031 | A1 | 2/2004 | Ooi et al. |
| 2004/0049589 | A1 | 3/2004 | Papanikolaou |
| 2004/0098598 | A1 | 5/2004 | Wolfram |
| 2004/0179588 | A1 | 9/2004 | Kuffner et al. |
| 2004/0236980 | A1 | 11/2004 | Chen |
| 2005/0235148 | A1 * | 10/2005 | Scheidt et al. ................ 713/168 |
| 2006/0230202 | A1 | 10/2006 | Lee |

FOREIGN PATENT DOCUMENTS

| | | |
|---|---|---|
| DE | 195 36 206 | 4/1996 |
| DE | 100 57697 | 5/2002 |

| | | |
|---|---|---|
| EP | 0 152 024 | 8/1985 |
| EP | 0 674 290 | 9/1995 |
| EP | 0 703 544 | 3/1996 |
| EP | 0 856 818 | 5/1998 |
| EP | 0 883 083 | 9/1998 |
| EP | 0 883 084 | 12/1998 |
| EP | 0 923 018 | 6/1999 |
| EP | 0 924 656 | 6/1999 |
| EP | 0 924 657 | 6/1999 |
| EP | 0 929 043 | 7/1999 |
| EP | 0 945 777 | 9/1999 |
| EP | 1 030 494 | 8/2000 |
| EP | 1 077 399 | 2/2001 |
| EP | 1 085 521 | 3/2001 |
| EP | 1 100 000 | 5/2001 |
| EP | 0 912 939 | 9/2001 |
| EP | 1 139 224 | 10/2001 |
| EP | 1 146 559 | 10/2001 |
| EP | 1 152 324 | 11/2001 |
| EP | 1 156 697 | 11/2001 |
| EP | 1 215 876 | 6/2002 |
| EP | 1 215 877 | 6/2002 |
| EP | 1 146 559 | 3/2006 |
| GB | 2 197 734 | 5/1988 |
| GB | 2 204 971 | 11/1988 |
| GB | 2 312 040 | 10/1997 |
| GB | 2 361 558 | 10/2001 |
| JP | 08-263631 | 10/1996 |
| JP | 9-69969 A1 | 3/1997 |
| JP | 9069067 | 3/1997 |
| JP | 10-283292 | 10/1998 |
| JP | 11-053060 | 2/1999 |
| JP | 11-143760 | 5/1999 |
| JP | 11-184992 | 7/1999 |
| JP | 11-265324 | 9/1999 |
| JP | 1126384 | 9/1999 |
| JP | 2000 048177 | 2/2000 |
| JP | 2000-181963 | 6/2000 |
| JP | 2000 200123 | 7/2000 |
| JP | 2000 200248 | 7/2000 |
| JP | 2000 209534 | 7/2000 |
| JP | 2000 307911 | 11/2000 |
| JP | 2000-331166 | 11/2000 |
| JP | 2000-350174 | 12/2000 |
| JP | 2001-059701 | 3/2001 |
| JP | 2001-069260 | 3/2001 |
| JP | 2001-069390 | 3/2001 |
| JP | 2001-118046 | 4/2001 |
| JP | 2001-128113 | 5/2001 |
| JP | 2001 216099 | 8/2001 |
| JP | 2001 344173 | 12/2001 |
| JP | 2001 346075 | 12/2001 |
| JP | 2002-041247 | 2/2002 |
| JP | 2002-092367 A | 3/2002 |
| JP | 2002-108823 A | 4/2002 |
| JP | 2002 157195 | 5/2002 |
| JP | 2002-185444 A | 6/2002 |
| JP | 2002-222022 | 8/2002 |
| JP | 2006-030326 | 2/2006 |
| JP | 2005-167965 | 6/2006 |
| KR | 1999-0018244 | 3/1999 |
| KR | 2000-0009757 | 2/2000 |
| KR | 10 2000 0054614 | 9/2000 |
| KR | 2000-0061817 | 10/2000 |
| KR | 2001-0044238 | 6/2001 |
| KR | 2001-0067730 | 7/2001 |
| KR | 2001-0074291 | 8/2001 |
| KR | 2001-0097886 | 11/2001 |
| KR | 2002-0014193 | 2/2002 |
| KR | 2002 085497 | 11/2002 |
| TW | 431101 | 4/2001 |
| TW | 439377 | 6/2001 |
| TW | 446851 | 7/2001 |
| TW | 453071 | 9/2001 |
| WO | 87/07063 | 11/1987 |
| WO | 89/12287 | 12/1989 |
| WO | 94/12938 | 6/1994 |
| WO | 95/16238 | 6/1995 |
| WO | 97/39549 | 10/1997 |
| WO | 98/07255 | 2/1998 |
| WO | 98/12670 | 3/1998 |
| WO | 98/13791 | 4/1998 |
| WO | 98/38567 | 9/1998 |
| WO | 99/08238 | 2/1999 |
| WO | 99/13434 | 3/1999 |
| WO | 99/16024 | 4/1999 |
| WO | 99/56429 | 4/1999 |
| WO | 99/40723 | 8/1999 |
| WO | 99/45460 | 9/1999 |
| WO | 99/52236 A1 | 10/1999 |
| WO | 99/56236 A1 | 11/1999 |
| WO | 99/60786 A1 | 11/1999 |
| WO | 99/63476 | 12/1999 |
| WO | 00/03316 | 1/2000 |
| WO | 00/07387 | 2/2000 |
| WO | 00/14987 | 3/2000 |
| WO | 00/19294 | 4/2000 |
| WO | 00/22774 A1 | 4/2000 |
| WO | 00/28471 | 5/2000 |
| WO | 00/28539 A1 | 5/2000 |
| WO | 00/42491 | 7/2000 |
| WO | 00/45696 A1 | 8/2000 |
| WO | 00/48135 A1 | 8/2000 |
| WO | 00/55707 | 9/2000 |
| WO | 00/60476 | 10/2000 |
| WO | 00/67098 | 11/2000 |
| WO | 01/06786 A1 | 1/2001 |
| WO | 01/08055 | 2/2001 |
| WO | 01/09845 | 2/2001 |
| WO | 01/15440 A1 | 3/2001 |
| WO | 01/16917 | 3/2001 |
| WO | 01/22351 | 3/2001 |
| WO | 01/23987 | 4/2001 |
| WO | 01/31577 | 5/2001 |
| WO | 01/33317 | 5/2001 |
| WO | 01/48612 | 7/2001 |
| WO | 01/61692 | 8/2001 |
| WO | 01/73570 | 10/2001 |
| WO | 01/86640 | 11/2001 |

OTHER PUBLICATIONS

Rogers, Sue; Techlink Seminar 3 New Mac Hardware and Peripherals; Nov. 19, 1999.
Universal Serial Bus Mass Storage Class Specification Overview; V 1.0 Revision; Oct. 22, 1998.
Universal Serial Bus Mass Storage Class/UFI Command Specification; Revision 1.0; Dec. 14, 1998.
Ziller, Jason and Fair, David; Which External I/O Bus is Right for You?; Intel Corporation; Intel Developer Update Magazine; Jan. 2000.

* cited by examiner

METHOD AND APPARATUS OF STORAGE ANTI-PIRACY KEY ENCRYPTION (SAKE) DEVICE TO CONTROL DATA ACCESS FOR NETWORKS

FIELD OF THE INVENTION

The present invention relates to the field of network communications. More specifically, the present invention relates to a secured access to restricted information over networks.

BACKGROUND

The piracy and illegal copying of software and other digital media has become extremely pervasive and currently results in billions of dollars in lost revenue for media and software owners worldwide. This problem is compounded by the advent of faster and more technologically advanced computers, the development of inexpensive mass storage media (i.e. CDs, DVDs), as well as copying devices such as CD writers, which aid in various aspects of digital piracy.

Each technological breakthrough seemingly results in a new and better way to illegally copy intellectual property belonging to another. Examples of digital piracy include: the copying of proprietary software to sell to others, the installing of a single proprietary software package on several different systems, placing a copy of proprietary software on the Internet, or even downloading copyrighted images from the Internet.

While digital piracy is fairly common among many end users who have lawfully purchased the software, large-scale piracy typically occurs at a reseller level. For instance, a reseller may duplicate and distribute multiple copies of a software program, a digital audio file or a digital video file to different customers. These counterfeit versions are sometimes passed on to unsuspecting customers. Hardware distributors have been known to preload different systems using a single software package. In such instances, customers are either not provided with original manuals, diskettes and/or compact discs (CDs) or are simply supplied with pirated copies of the same.

Numerous methods to combat the rampant problem of digital piracy have been devised. One of the methods is the use of trialware to restrict usage of a software product. Trialware may be implemented by either programming an expiration date or a usage counter into a software program. Such a scheme limits the use of a software product to a particular duration or a number of trial times, respectively, after which the protected application can no longer be launched. Users are then forced to either purchase the full version of the product or to quit using it altogether.

Hardware keys are another type of anti-piracy device that is commonly used to prevent illegal use of software. Hardware keys are devices that are plugged into selected ports of a computer. Once the software is executed, it then detects the presence of a hardware key in a similar manner to detecting other hardware devices (such as a printer, monitor or a mouse). Programming the software such that it only operates when an appropriate hardware key is attached prevents illegal use of the software. As the number of hardware keys distributed to end users correspond to the number of seat licenses purchased, the software will not work when installed on another system without the requisite hardware key.

Another common anti-piracy technique is to require the entry of a certain registration key that is supplied by the software company before the software can be installed. Traditionally, the registration keys are given only with the original software package, although some are issued electronically. Unfortunately, there is nothing to prevent the holder of the registration key from installing the software on multiple systems. In addition, many of the electronic registration keys are based on the user's personal information (i.e. such as the user's name), therefore, some hackers have developed programs to calculate registration keys for random names.

Unfortunately, as with the use of the registration key, all of the above anti-piracy systems (and many others) are easily circumvented by hackers. A common method of combating these anti-piracy techniques is to disassemble the coding of the Application Programming Interface (API) to assembly language and, thereafter, decompile the assembly language into programming language. With the knowledge gained from the program flow, the hacker can easily re-write the program or set certain conditions within the program itself, such that it bypasses all the anti-piracy authentication algorithms.

In view of the foregoing, it is extremely desirable to have an anti-piracy system that cannot be easily re-programmed or bypassed by computer hackers or other digital pirates. It is also desirable to have an anti-piracy system that can be integrated with existing mass storage devices.

SUMMARY OF THE INVENTION

According to one aspect of the present invention, a method of storage anti-piracy key encryption ("SAKE") is provided in which a SAKE device is coupled to a host or client system and the SAKE device obtains user's biometric identity information through its biometric sensor. User's biometric identity information, such as fingerprints, is verified according to the biometric templates stored in an internal memory unit of the SAKE device. Various initialization information including a public key associated with the user is retrieved from the internal memory unit of the SAKE device and the initialization information is provided to an information provider or Internet Service Provider ("ISP") via a computer network such as the Internet, through the host system. Upon verifying the initialization information, a network communication is established between the SAKE device and the information provider. When the SAKE device obtains information from the information provider, the information is encrypted and stored in a flash memory within the SAKE device.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

An apparatus and method for providing data access control over the Internet are discussed.

In the following description, for purposes of explanation, numerous specific details are set forth to provide a thorough understanding of the present invention. It will be apparent, however, to one skilled in the art that these specific details may not be required to practice the present invention. In other instances, well-known circuits and devices are shown in block diagram form to avoid obscuring the present invention.

It is understood that the present invention may contain transistor circuits that are readily manufacturable using well-known art, such as for example CMOS (complementary metal-oxide semiconductor) technology, or other semiconductor manufacturing processes. In addition, the present invention may be implemented with other manufacturing processes for making digital devices.

Figure 1:
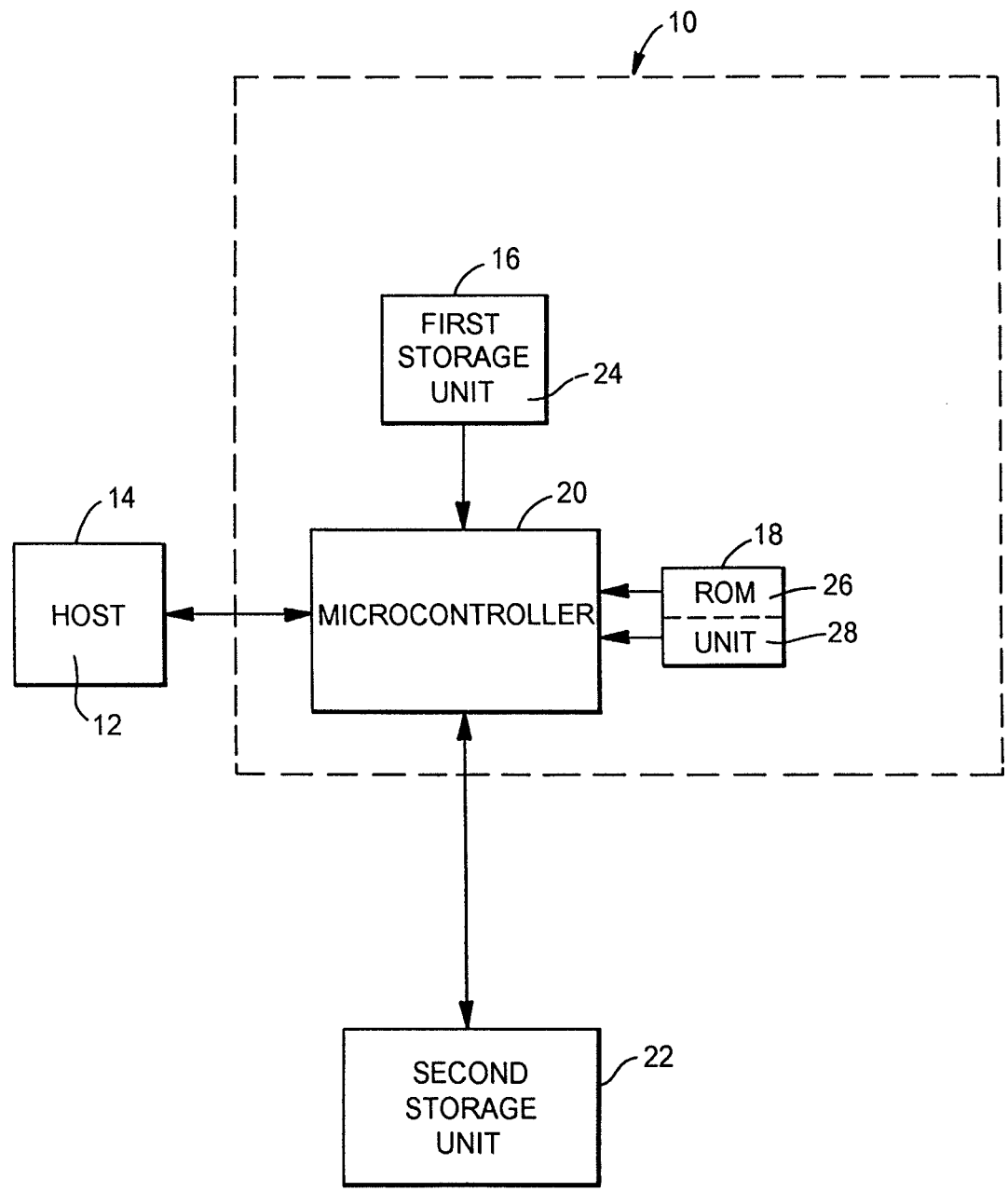
FIG. 1 illustrates a schematic of an authentication system to verify a password from a host in accordance with one embodiment of the present invention.

FIG. 1 illustrates an authentication system 10 to verify a password 12 from a host 14 in accordance with one embodiment of the present invention. Authentication system 10 includes a first storage unit 16, a read-only memory (ROM) unit 18 and a microcontroller 20. Microcontroller 20 is coupled to host 14, first storage unit 16, ROM unit 18 and a second storage unit 22. Microcontroller 20 is preferably coupled to host 14 through a Universal Serial Bus (USB) controller.

In other embodiments of the present invention, ROM unit 18 may be formed as part of microcontroller 20. Furthermore, both first storage unit 16 and second storage unit 22 may be one of a number of mass storage devices, including hard drives, floppy disks, or removable flash memory devices, such as the ThumbDrive™ manufactured by Trek 2000. In addition, the two storage units may be utilized in one physical structure to form a single mass storage device. The mass storage device may also be placed with microcontroller 20 to form a single chip.

First storage unit 16 stores an authentication sequence 24, which is used to verify password 12. An authentication algorithm 26 to authenticate password 12 with authentication sequence 24 is programmed onto ROM unit 18. In addition, ROM unit 18 preferably comprises a shutdown algorithm 28. Because these algorithms and other data are hard coded, the contents of ROM unit 18 cannot be decompiled or altered. Upon receiving password 12, microcontroller 20 loads and executes authentication algorithm 26 to verify password 12 with authentication sequence 24. Access to second storage unit 22 is permitted only if password 12 is verified.

Password 12 may be entered by a user or a software program executed by host 14 after receiving a query from microcontroller 20. Because authentication algorithm 26 is hard coded onto ROM unit 18, copying or decompiling and changing the software program resident on host 14 does not breach the copy protection provided by the present invention. It will be apparent to one skilled in the art that password 12 may be a private string of characters, a sequence of communication protocols or some other security protocol known only to an authorized user. In addition, password 12 and authentication sequence 24 may form part of a biometric authentication process by using a user's fingerprints, iris, face, or voice as authentication means.

Password 12 may also be programmed into the software running on host 14 and recognizable only by authentication algorithm 26 and therefore not known to an end user. As described above, authentication algorithm 26 is preferably implemented on hardware or firmware (such as ROM unit 18) so that it is tamper resistant; that is, authentication algorithm 26 will be either extremely difficult to reverse engineer or extract data from, and therefore extremely difficult to bypass.

Shutdown algorithm 28 is preferably implemented as a deterrent against brute force attacks by shutting down the entire system if a series of incorrect passwords is received by microcontroller 20. An authentication system programmer may define the maximum number of incorrect passwords allowed before the system shuts down. Shutdown algorithm 28 may also be programmed to not accept any more password entries for a specified amount of time. By using shutdown algorithm 28, trial and error methods used by brute force application programs to identify password 12 would become an extremely tedious process for hackers. Shutdown algorithm 28 would therefore deter potential hackers from even attempting to identify password 12.

Second storage unit 22 is used to store programs and/or files, which are required for a program on host 14 to run. Examples of such files include executable programs such as a software installer, digital audio files, digital video files, image files, text files, and library files. Microcontroller 20 allows access to second storage unit 22 from host 14 only if the correct password 12 has been received by microcontroller 20.

Although illustrated in this embodiment as separate entities, it should be evident to a person skilled in the art that microcontroller 20, first storage unit 16, ROM unit 18 and second storage unit 22 may be combined in a number of ways. For example, microcontroller 20, first storage unit 16, ROM unit 18 and second storage unit 22 may be implemented on a single semiconductor chip. In an alternative embodiment, microcontroller 20 and ROM unit 18 may be implemented on a chip that is separate from the storage units.

The present invention therefore has great flexibility of design that may easily be altered depending on a user's requirements. For example, on one hand, the use of multiple chips may allow different vendors to manufacture different parts of the authentication system. On the other hand, fabricating the present invention onto fewer chips (or a single chip) may be less expensive and provide better performance. In addition, if ROM unit 18 and microcontroller 20 are located on the same chip, it may be more difficult to separate the ROM to read the data stored.

Figure 2:
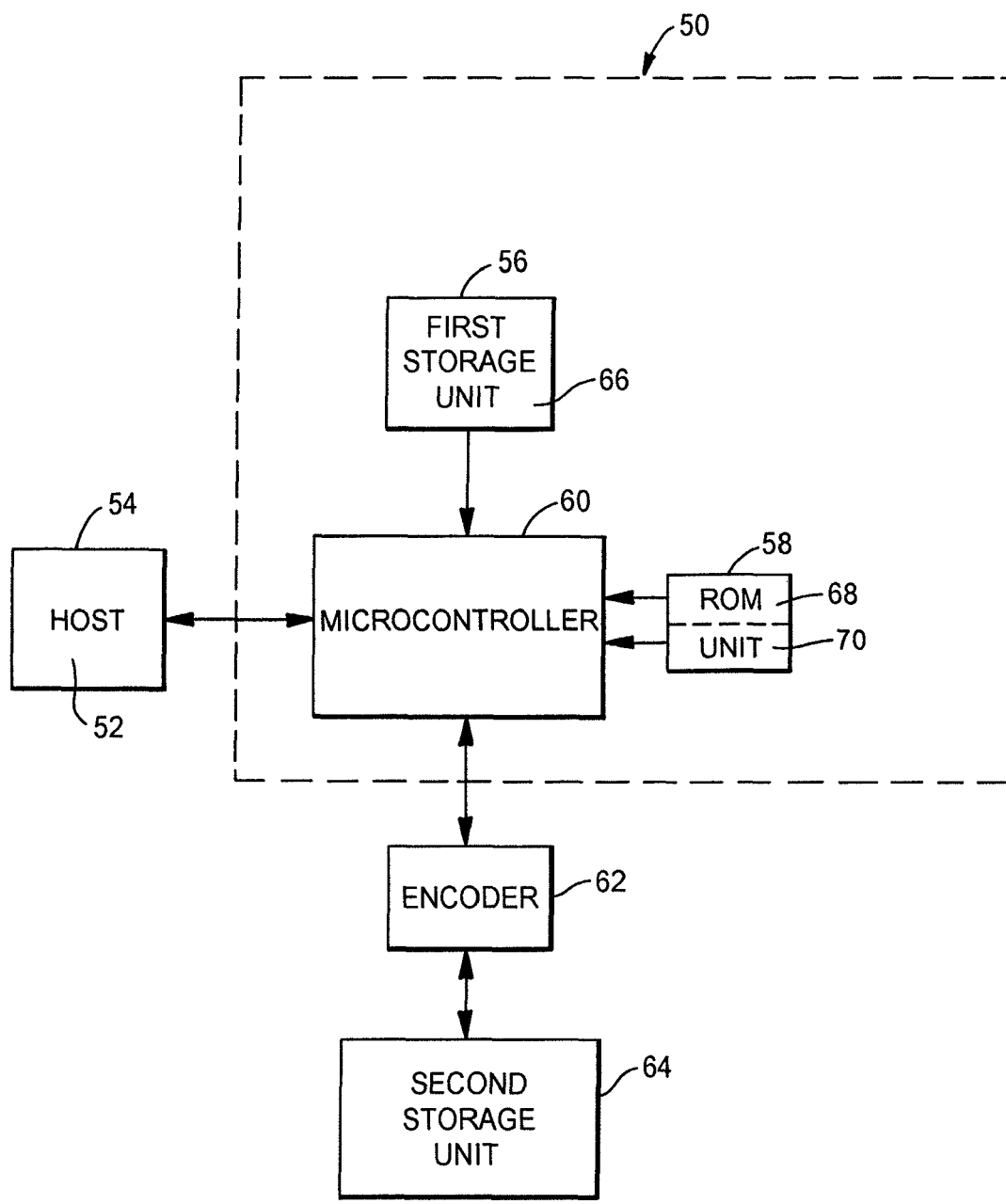
FIG. 2 illustrates a schematic of an authentication system to verify a password from a host in accordance with a further embodiment of the present invention.

FIG. 2 illustrates an authentication system 50 to verify a password 52 from a host 54 in accordance with a further embodiment of the present invention. Authentication system 50 comprises a first storage unit 56, a ROM unit 58 and a microcontroller 60. Microcontroller 60 is coupled to host 54, first storage unit 56, ROM unit 58 and an encoder 62. Encoder 62 is further coupled to a second storage unit 64. First storage unit 56 stores an authentication sequence 66, which is used to verify password 52. An authentication algorithm 68 to authenticate password 52 is programmed onto ROM unit 58. ROM unit 58 preferably includes a shutdown algorithm 70.

Upon receiving password 52, microcontroller 60 loads and executes authentication algorithm 68 to verify password 52 with authentication sequence 66. Access to second storage unit 64 is permitted only if password 52 is verified. Shutdown algorithm 70 preferably shuts down the entire system if a series of wrong passwords is received by microcontroller 60. An authentication system programmer determines the maximum number of incorrect password attempts allowed.

Data to be read from or written onto second storage unit 64 is first decrypted or encrypted respectively by encoder 62. Many different encryption schemes may be used by encoder 62, including International Data Encryption Algorithm (IDEA), Data Encryption Standard (DES) encryption, Triple Data Encryption Standard (3-DES) encryption, and Pretty Good Privacy (PGP). By encrypting the contents of second storage unit 64, a hacker will not be able to make sense of the contents even if he manages to read the contents by bypassing microcontroller 60 (for example, by using a probe). After password 52 has been authenticated, a decoder (not illustrated) may be used to decrypt the contents of second storage unit 64.

Alternatively, the data stored in second storage unit 64 may be protected by hash coding. In addition, authentication sequence 66 is preferably encrypted or hashed as well to prevent hackers from unraveling authentication sequence 66. This may be accomplished without requiring an additional encoder if first storage unit 56 is located within second storage unit 64.

Figure 3:
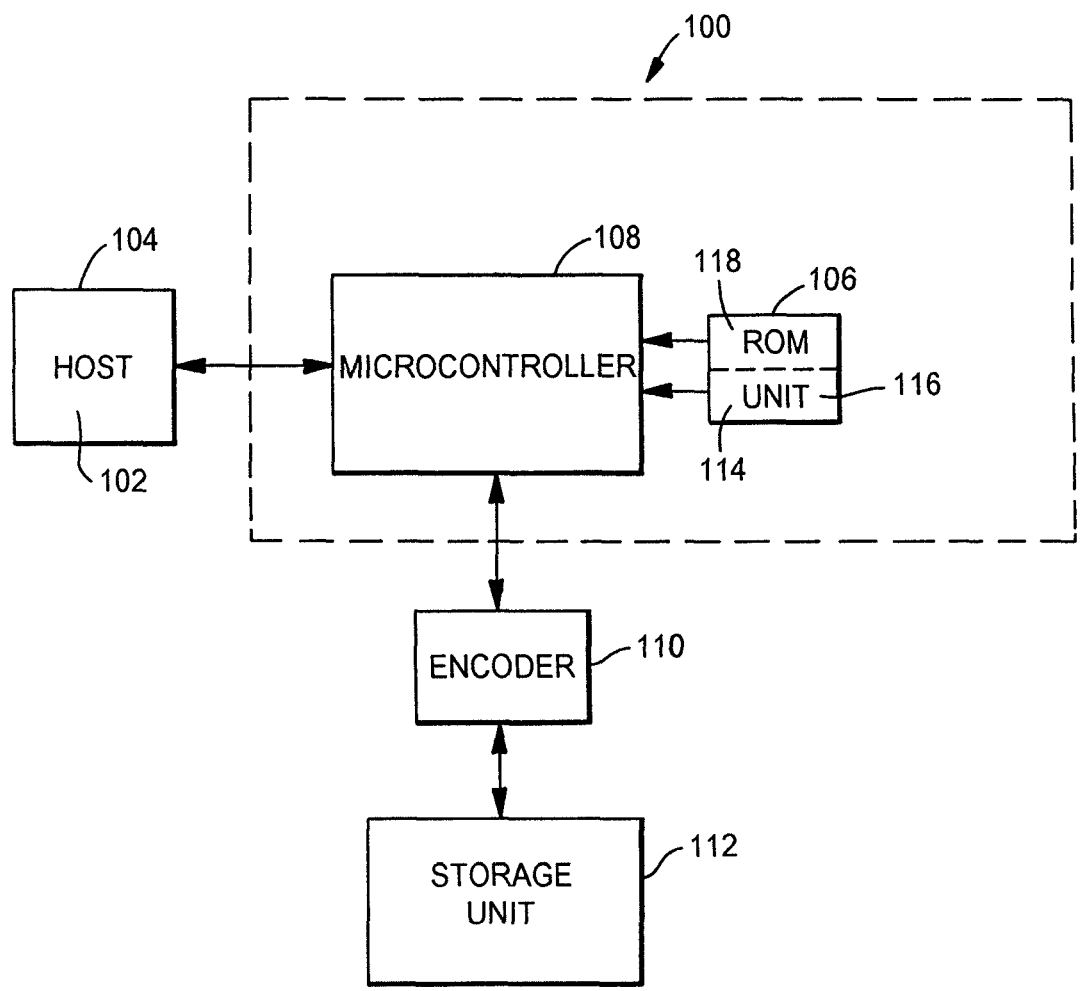
FIG. 3 illustrates a schematic of an authentication system to verify a password from a host in accordance with another embodiment of the present invention.

FIG. 3 illustrates a schematic of an authentication system 100 to verify a password 102 from a host 104 in accordance with another embodiment of the present invention. Authentication system 100 comprises a ROM unit 106 and a microcontroller 108. Microcontroller 108 is coupled to host 104, ROM unit 106, and an encoder 110. Encoder 110 is further coupled to a storage unit 112. An authentication algorithm 114 to authenticate password 102 is programmed onto ROM unit 106. An authentication sequence 116 to verify password 102 is hard coded into authentication algorithm 114. ROM unit 106 preferably comprises a shutdown algorithm 118.

As described in previous embodiments, upon receiving password 102, microcontroller 108 loads and executes authentication algorithm 114 to verify password 102 with authentication sequence 116. Access to storage unit 112 is permitted only if password 102 is verified. Shutdown algorithm 118 is preferably used to shut down the entire system if a series of incorrect passwords is received by microcontroller 108.

By hard coding authentication sequence 116 directly into authentication algorithm 114, possibly in multiple places, modification of authentication sequence 116 becomes substantially more difficult. In order to change a hard coded authentication sequence, not only is recompilation necessary (if using a compiled language), but also sufficient understanding of the implementation is required to ensure that the change will not cause program failure. Such a measure makes it difficult for a hacker to re-program authentication system 100.

Figure 4:
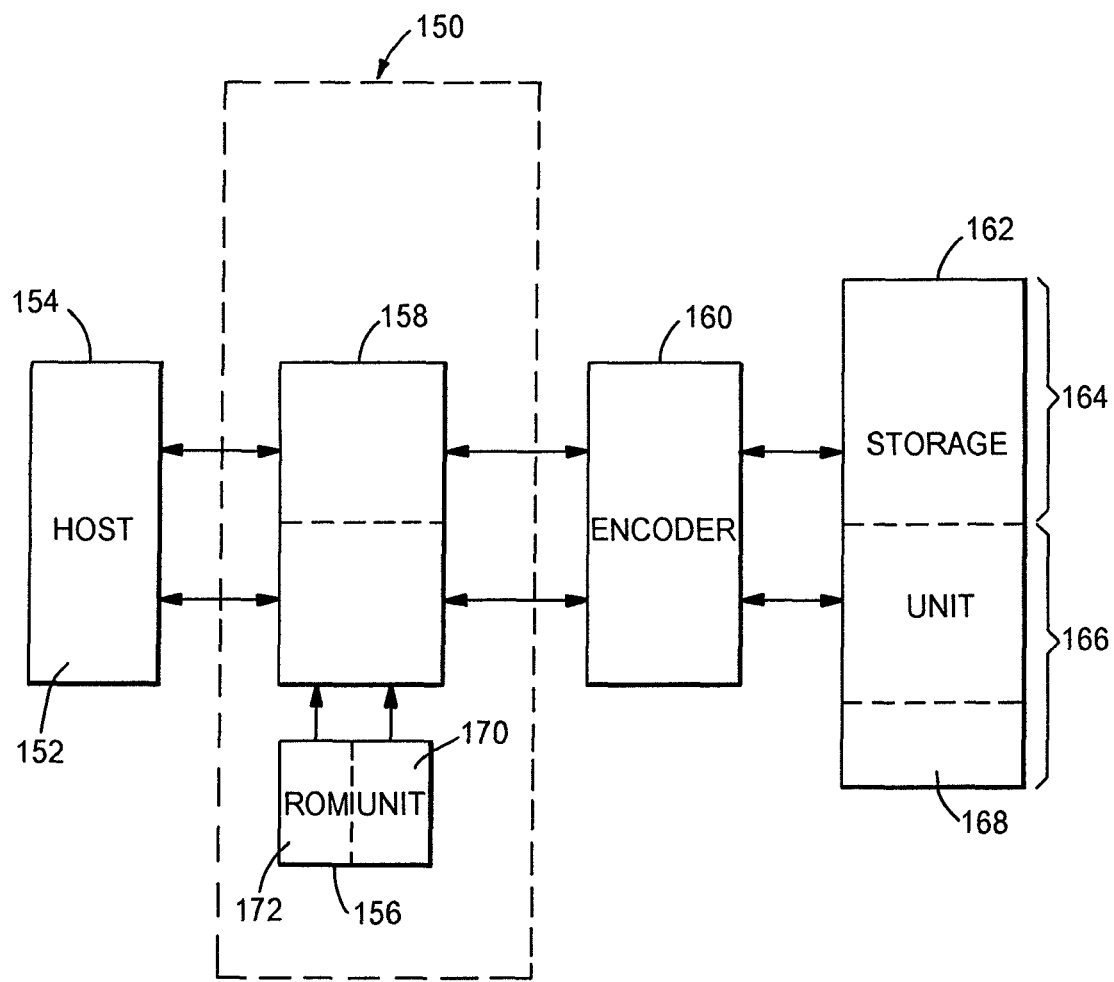
FIG. 4 illustrates a schematic of an authentication system to verify a password from a host in accordance with yet another embodiment of the present invention.

FIG. 4 illustrates an authentication system 150 to verify a password 152 from a host 154 in accordance with another embodiment of the present invention. Authentication system 150 comprises a read-only memory (ROM) unit 156 and a microcontroller 158. Microcontroller 158 is coupled to host 154, ROM unit 156, and an encoder 160. Encoder 160 is further coupled to a storage unit 162. Data to be read from or written onto storage unit 162 is first decrypted or encrypted respectively by encoder 160. Alternatively, hash coding may be employed to protect the data stored in storage unit 162.

Storage unit 162 is made up of two types of data storage areas: a public storage area 164 and a private storage area 166. An authentication sequence 168, which is used to verify password 152, is stored in private storage area 166. An authentication algorithm 170 to authenticate password 152 is programmed onto ROM unit 156. ROM unit 156 also contains a shutdown algorithm 172. Public storage area 164 and private storage area 166 may be created by under-declaring the memory size available on storage unit 162.

Take for example a storage unit with physical addresses ranging from 000 to 1000. If only physical addresses 000 to 500 are declared to an operating system (OS) such as Windows™, on host 154, the OS will not be aware of the presence of physical addresses 501 to 1000. Under such circumstances, data stored within physical addresses 000 to 500 will be accessible to any user. This area is known as a public storage area. Conversely, undeclared physical addresses 501 to 1000 form a private storage area since these addresses are only available to microcontroller 158 and can only be accessed by an authorized user or software program.

Under non-secure operating conditions, any user may instruct host 154 to read data from or write data onto public storage area 164. However, if a user wishes to access private storage area 166, the user or the software program must first enter password 152, which is then sent to microcontroller 158 for authentication. Upon receiving password 152, microcontroller 158 executes authentication algorithm 170 to verify password 152 with authentication sequence 168. Access to private storage area 166 is permitted only if password 152 is verified. Shutdown algorithm 172 shuts down the entire system if a series of incorrect passwords is received by microcontroller 158.

Figure 5:
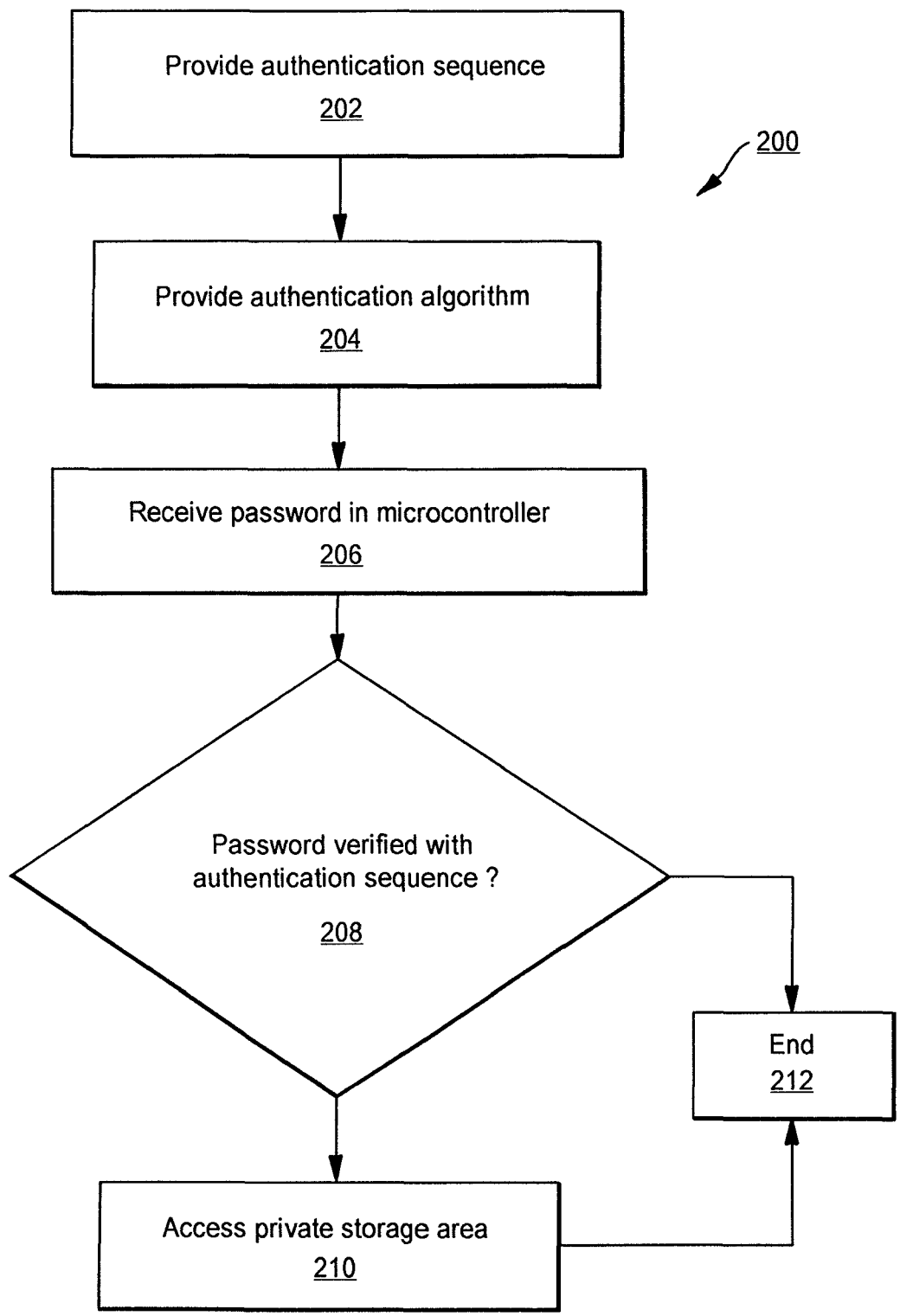
FIG. 5 illustrates a method for authenticating a password from a host in accordance with one embodiment of the present invention.

FIG. 5 illustrates a method 200 for authenticating a password from a host in accordance with one embodiment of the present invention. An authentication sequence is first provided in a block 202 and preferably stored in a first storage unit. Also provided, in another block 204, is an authentication algorithm, which is stored in a ROM unit. After receiving a prompt from the host, a password is entered in by a user or by a software program. The password is then received in a block 206 by a microcontroller that executes an authentication algorithm to verify the password with the authentication sequence in a decision block 208.

If the password is verified in decision block 208, access to a private area, such as second storage unit in the above-described embodiments, will be permitted in a block 210. The user is then able to read from or write onto the second storage unit, which is preferably encrypted. If the password is not verified in decision block 208, the user will be denied access to the second storage unit and method 200 will end in a block 212. Alternatively, if the password is incorrect, the user may be given additional chances to enter the right password. However, the system is preferably shut down if a series of incorrect passwords is received by the microcontroller.

Figure 6:
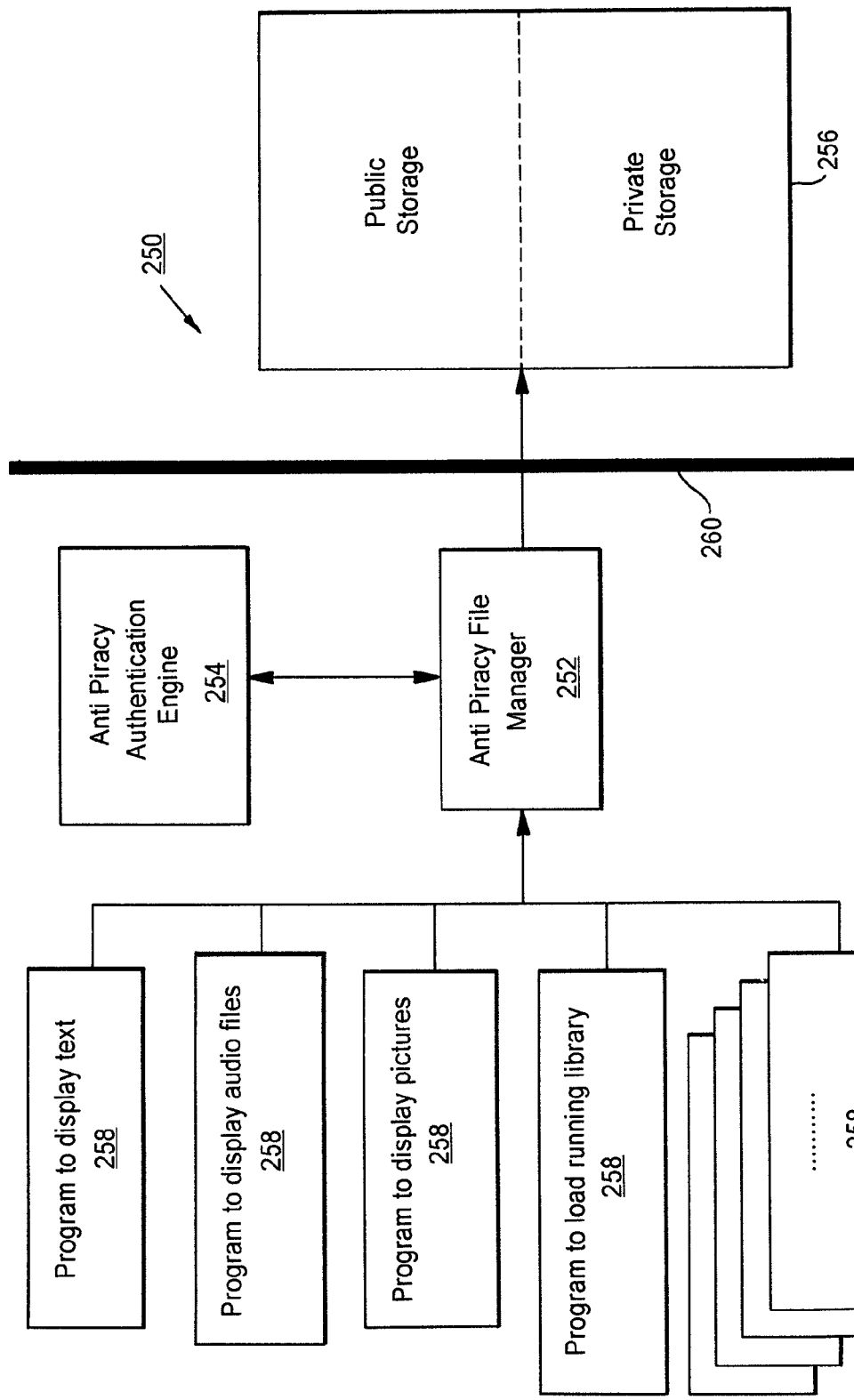
FIG. 6 illustrates a schematic of a computer system using an anti-piracy file manager in accordance with a further embodiment of the present invention.

FIG. 6 illustrates a schematic of a computer system 250 using an anti-piracy file manager 252 in accordance with a further embodiment of the present invention. Anti-piracy file manager 252 is coupled to an anti-piracy authentication engine 254 and a storage unit 256. Anti-piracy file manager 252 answers requests from a number of software programs 258 that request different authentication schemes from anti-piracy authentication engine 254. Access to storage unit 256 is guarded by an authentication system 260. In this exemplary system, the flexibility of the present invention allows for authentication of many different types of software programs at the same time through anti-piracy file manager 252.

Figure 7:
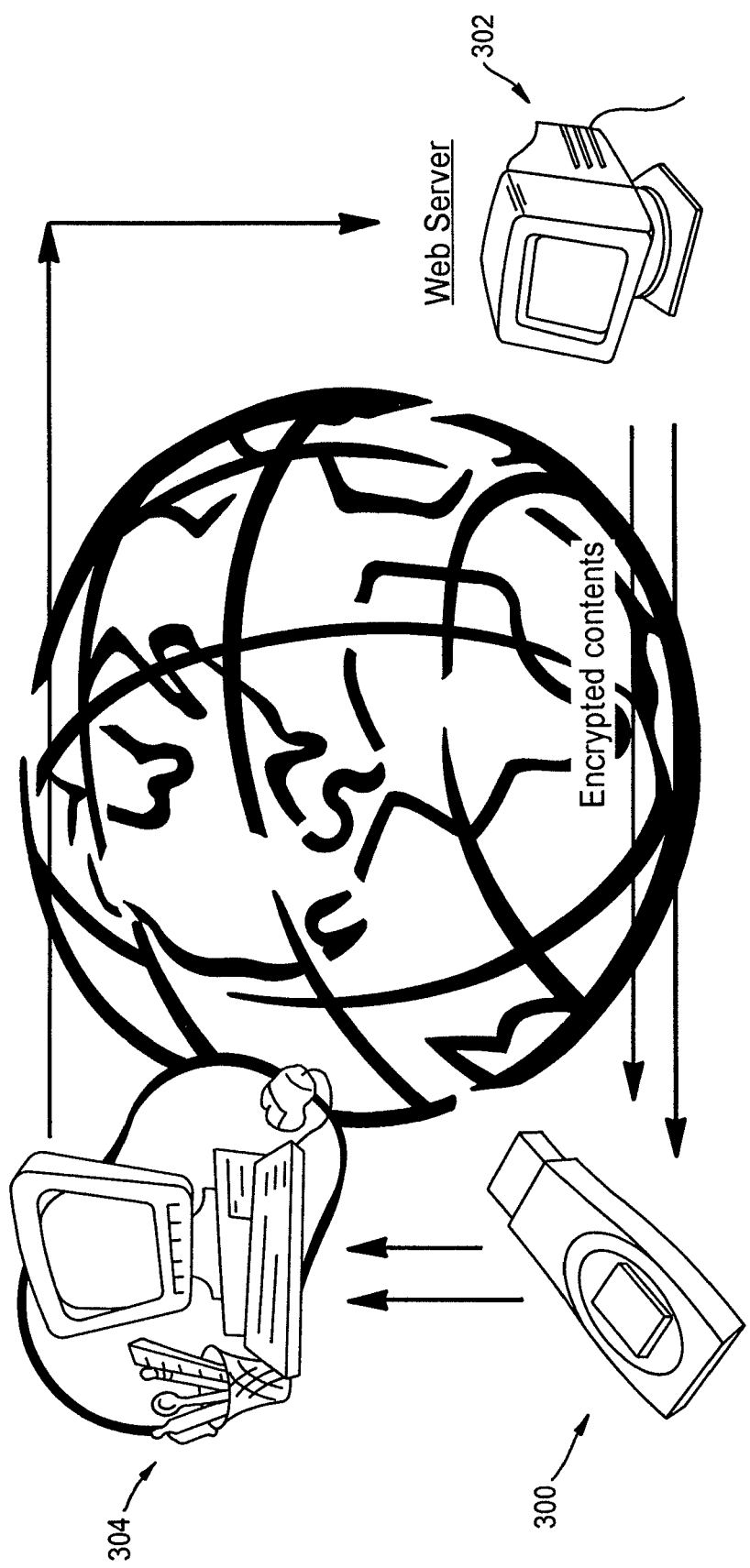
FIG. 7 illustrates a schematic of an authentication system for receiving data from a web server in accordance with another embodiment of the present invention.

FIG. 7 illustrates a schematic of an authentication system 300 for receiving data from a web server 302 in accordance with another embodiment of the present invention. Authentication system 300 is coupled to a host 304, which is connected to web server 302, typically by using either a dial-up or a broadband connection. Host 304 is coupled to authentication system 300, preferably, via a USB connector. Examples of host 304 include a personal computer (PC), a personal digital assistant (PDA), a Wireless Application Protocol-enabled (WAP-enabled) mobile phone, and a tablet.

To retrieve data from web server 302, a password received by host 304 is verified by authentication system 300. The password is typically entered by a user or by software on the host. If the password is entered by the user, authentication system 300 may also be configured to accept a biometrics password, such as a fingerprint or a retina scan. If the verification is successful, authentication system 300 sends a request through host 304 for access to web server 302. Upon receiving the request, web server 302 grants access to a web page having secured data. The data may be in the form of a music file or an online book or a software program. Because the authentication algorithm in authentication system 300 is hard coded, an unauthorized user will not be able to circumvent or change the verification scheme in authentication system 300 and, hence, will be unable to access the data on web server 302.

In another embodiment of the present invention, the password is embedded in the data to be retrieved over the Internet. Host 304 sends a request for the data to web server 302. Upon receiving the request, web server 302 sends the password embedded in the requested data to authentication system 300 for verification. If the verification is successful, authentication system 300 allows host 304 to access the data, whereupon it may be displayed or executed. In a preferred embodiment, the data from web server 302 is encrypted. Decryption of the data is carried out in authentication system 300 before use in host 304 or storage in authentication system 300.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

Overview of Storage Anti-Piracy Key Encryption ("SAKE") Device

According to one aspect of the present invention, a method is provided in which a SAKE device is coupled to a host or client system and the SAKE device obtains a user's biometric identity information through its biometric sensor. The user's biometric identity information, such as a fingerprint, is verified according to biometric templates stored in an internal memory unit of the SAKE device. Various initialization information including a public key associated with the user is retrieved from the internal memory unit of the SAKE device and the initialization information is provided to an information provider or Internet Service Provider ("ISP") via a computer network such as the Internet, through the host system. Upon verifying the initialization information, a network communication is established between the SAKE device and the information provider. When the SAKE device obtains information from the information provider, the information is encrypted and stored in a flash memory within the SAKE device.

In one embodiment, the SAKE device is a storage and anti-piracy device that includes onboard biometric verification capability. The SAKE device has universal connectivity capabilities, such as USB connectors. High-speed data transfer and large memory capacity are other advantages of the SAKE device. For example, the SAKE device may have the memory capacity of one gigabyte and have an access speed of up to one gigabit per second. A more detailed discussion of the SAKE device is provided below.

Figure 8:
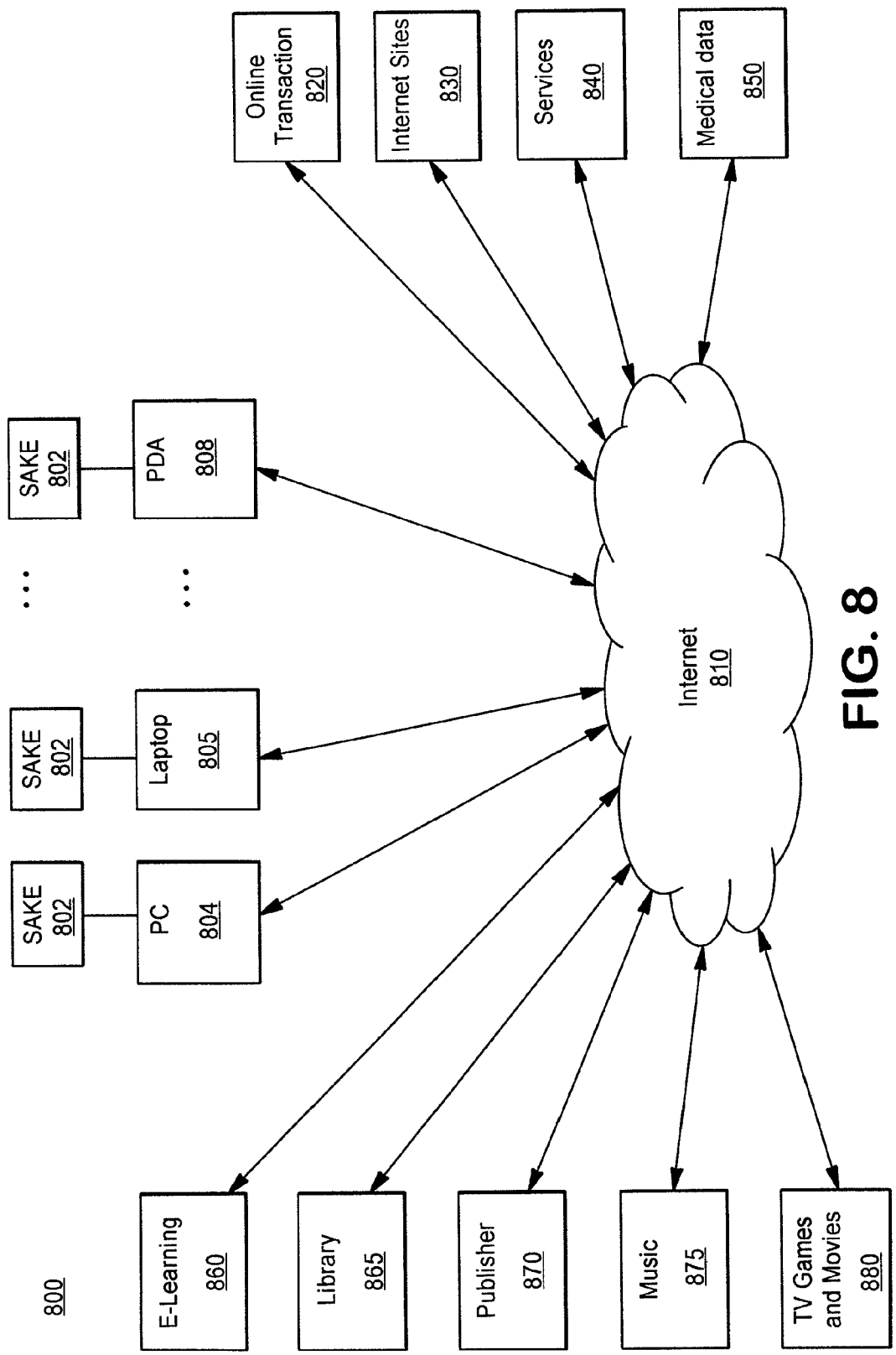
FIG. 8 illustrates a network configuration in accordance with one embodiment of the invention.

FIG. 8 illustrates a network configuration 800 in accordance with one embodiment of the invention. Network configuration 800 includes multiple SAKE devices 802, host systems, Internet 810, and various information providers, content providers and/or ISPs. The host systems, in one aspect, includes personal computer ("PC") 804, laptop 805, personal digital assistant ("PDA") 808 and other digital processing systems, such as servers, mini-computers, mainframe computers, point of sale machines, workstations, et cetera. Internet 810, in another embodiment, may be an Intranet, wide area network ("WAN"), and/or local area network ("LAN"). Information providers include online transaction 820, Internet sites 830, sales of services 840, personal medical information 850, e-learning materials 860, library 865, publisher 870, music 875, and TV games and movies 880. It is apparent to one of ordinary skill in the art that other functional blocks may be added to network configuration 800.

The content provider of online transaction 820 includes various online sale transactions, which includes online sales of merchandise, software, information, and network services over the Internet. In one embodiment, the SAKE device 802 provides a secured transaction, which involves accessing, purchasing, and downloading the product, between the user and the information provider. An advantage of using the SAKE device is to prevent unauthorized, rampant copying of commercial information.

The content provider of Internet sites 830 includes various restricted web sites that require, for example, memberships to access the information posted on the restricted web sites. In one embodiment, the SAKE device 802 provides a controlled access to restricted Internet sites. In another embodiment, the SAKE device 802 provides a method of controlled distribution of information received by the SAKE device 802. An advantage of using the SAKE device in this case is to prevent unauthorized access.

The content provider of services 840, in one aspect, includes various online services that provide support, resources, and/or upgrades. In one embodiment, the SAKE device 802 provides a method of providing services and/or upgrades to clients who are authorized and/or registered for the services. An advantage of using the SAKE device in this case is to prevent unauthorized parties from receiving services.

The content provider of medical data 850, in one aspect, contains medical information, such as a restricted hospital website. In one embodiment, the SAKE device 802 provides a secured method to retrieve personal medical information over the Internet from the content provider for medical data 850. An advantage of using the SAKE device in this case is to prevent unauthorized parties from accessing personal medical data.

The content provider of e-learning 860, in one aspect, includes various online educational materials that are either posted on the web page or downloaded from the website. In one embodiment, the SAKE device 802 provides a secured method to download various educational and/or learning materials to from the content provider to various clients who are authorized and/or registered to receive the educational materials. An advantage of using the SAKE device in this case is to prevent unauthorized parties from downloading the educational materials from the content provider of e-learning 860.

The content provider of library 865 and publisher 870, in one aspect, includes various online books and articles that either can be checked out or purchased. In one embodiment, the SAKE device 802 provides a secured method of purchase or checkout by downloading a digital a copy of book and/or article for authorized users. An advantage of using the SAKE device in this case is to prevent unauthorized parties from obtaining copies of books and articles posted on the websites.

The content provider of music 875 and television games/movies 880, in one aspect, includes various online digital music and games/movies that either can be checked out or purchased. In one embodiment, the SAKE device 802 provides a secured method of purchase or check out of a digital copy of music, games and/or movies for authorized users. An advantage of using the SAKE device in this case is to prevent unauthorized parties from obtaining copies of music, games and/or movies posted on the websites.

In operation, when, for example, a user desires to purchase software from a website, a SAKE device first authenticates the user, which may involve a biometric identification process. After the identity of the user is verified, the SAKE device notifies the website with an access request and security codes. Upon acknowledgement of the access request and security codes, the website, which could act through an ISP, establishes a network communication with the SAKE device over the Internet 810. An encrypted public key is subsequently forwarded from the SAKE device to the website to confirm the true identity of the user. Once the user's identity is confirmed by the website, it sends the requested software to the SAKE device via the SAKE device's host system. Upon receiving the software, it is directly stored in the flash memory of the SAKE device with limited or no trace in the host system.

An advantage of using the SAKE device, functioning as an anti-piracy device, is to prevent unauthorized copying of information over the Internet. Another advantage of using the SAKE device is to store the downloaded content directly into the SAKE device only, thereby there is no traces on the host system after the SAKE device is disconnected from the host system. Another advantage is to employ personal and biometric information to authenticate users before the users are given access to quality content over a network, such as the Internet or an Intranet.

Figure 9:
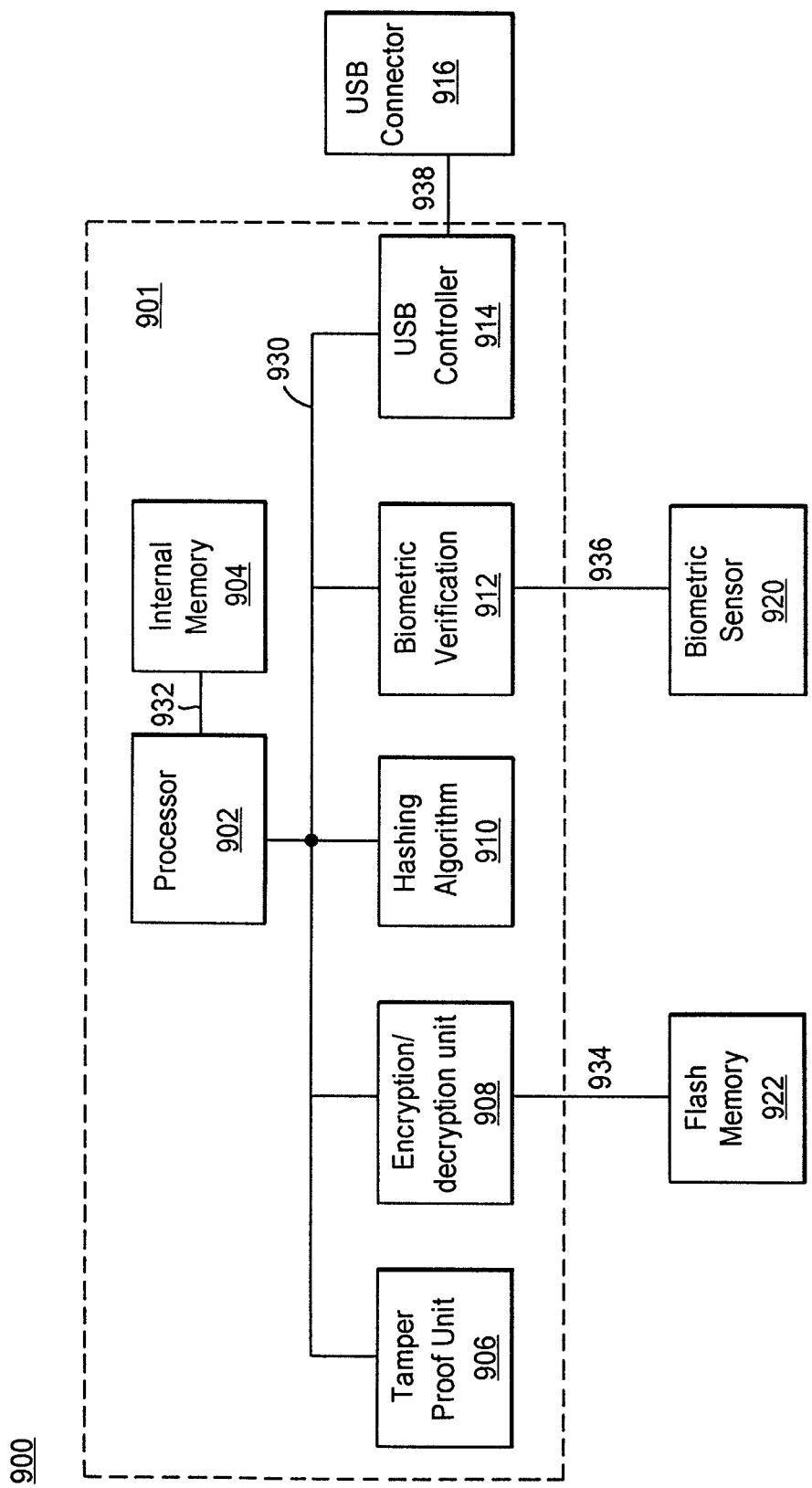
FIG. 9 is a block diagram illustrating a SAKE device in accordance with one embodiment of the present invention.

FIG. 9 is a block diagram illustrating a SAKE device 900 in accordance with one embodiment of the present invention. The SAKE device 900 includes a micro-control unit ("MCU") 901, flash memory 922, USB connector (plug) 916 and biometric sensor 920. MCU 901 further includes a processor 902, internal memory 904, tamper proof unit 906, encryption/decryption unit 908, hashing algorithm 910, biometric verification 912, and USB controller 914. In one embodiment, processor 902, internal memory 904, tamper proof unit 906, encryption/decryption unit 908, hashing algorithm 910, biometric verification 912 and USB controller 914 are fabricated on a single die. Various buses 930-938 are used to couple various units in the SAKE device 900. It is apparent to one of ordinary skill in the art that other functional blocks may be added to the SAKE device 900.

Processor 902 is coupled to buses 930-932 for communicating information to and from various components. Processor 902 includes a microprocessor, processor, central processing unit, or digital processing unit such as Pentium™, PowerPC™, Alpha™ and the like. Processor 902 controls the data flow of the SAKE device 900 through executing instructions. In one embodiment, processor 902 executes navigation software, which may be stored in internal memory 904, for controlling the data flow.

Internal memory 904, in one embodiment, is a flash memory designed to store authentication data, such as public keys, private keys, biometric templates, et cetera. It should be noted that public keys, private keys, and biometric templates are loaded into internal memory 904 during the setup or initialization of the SAKE device 900. Internal memory 904 is coupled to processor 902 through dedicated bus 932 for fast data store and fetch. In another embodiment, internal memory 904 is coupled to processor 902 through system bus 930. Biometric templates include fingerprint and/or iris templates. In another embodiment, internal memory 904 stores the navigation software, which is responsible to control data flow between an ISP and the SAKE device 900. The navigation software is also responsible to retrieve data from flash memory 922 and then to display the data.

Biometric sensor 920 is coupled to biometric verification unit 912 via bus 936, wherein biometric sensor 920 detects biometric information or patterns from a user. For example, a fingerprint sensor as biometric sensor 920 detects fingerprint patterns from the user who is currently holding the SAKE device 900. Once the fingerprint of the user is obtained, it is forwarded from the fingerprint sensor to biometric verification unit 912 for authenticating the user. Upon receipt of the biometric information, biometric verification unit 912 fetches biometric templates, such as fingerprint templates, from internal memory 904 via processor 902 and authenticates the biometric information just received against the biometric templates. The result of the authentication is forwarded to processor 902. It should be noted that the biometric templates are loaded during the initialization of the SAKE device.

USB controller 914 is coupled to system bus 930 and USB connector 916 via a dedicated bus 938. USB controller 914 is designed to control communication between the SAKE device 900 and the host system, not shown in FIG. 9. USB connector 916, in one embodiment, is a USB plug that is capable of directly connecting to a USB port of host system. USB connector 916 is designed to support the entire weight of the SAKE device while it is plugged in a USB port. It is further noted that when the SAKE device is plugged in a USB port of the host system, only a portion of the SAKE device is inserted into the host system.

Hashing algorithm 910 is coupled to system bus 930 to perform a hash function. Hashing algorithm 910 is, in one embodiment, a standard hashing algorithm, such as secure hash standard (SHS) and is designed to hash public keys before they are being sent to their destination over the Internet.

Flash memory 922 is coupled to MCU 901 via bus 934 and is configured to store large amounts of data. For example, flash memory 922 can store up to one gigabyte. In one embodiment, flash memory 922 has the capacity of mass storage, and data downloaded from the ISP can be directly stored in flash memory 922. To secure data from hacking, data is encrypted before it is stored in flash memory 922. Encryption/decryption unit 908 is coupled to system bus 930 and coupled to flash memory 922 via bus 934. In one embodiment, encryption/decryption unit 908, which may be a standard encryption code, encrypts data according to a private key before it stores the data in flash memory 922. Encryption/decryption unit 908 is also used to decrypt data according to a private key after the data is fetched from flash memory 922.

Tamper proof unit 906 is coupled to system bus 930. A function of tamper proof unit 906 is designed to erase data stored in internal memory 904 and flash memory 922 when tamper proof unit 906 detects tampering or hacking of the SAKE device using high temperature, voltage, and/or frequency. In one embodiment, tamper proof unit 906 contains sensors that can detect abnormal conditions, such as voltage, frequency and temperature that are beyond the specification.

Figure 10:
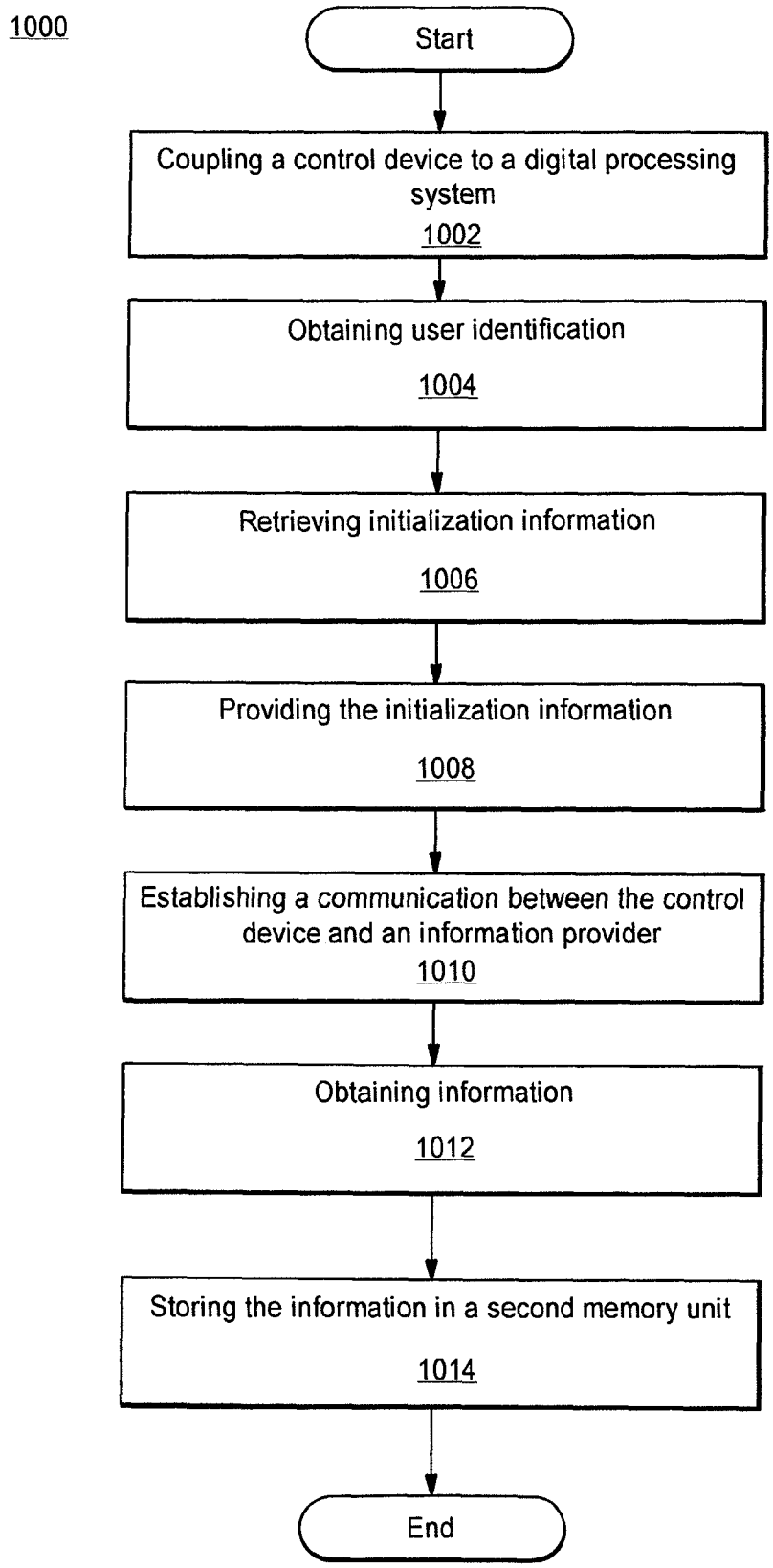
FIG. 10 is a flowchart illustrating a method of providing data access control over a network in accordance with one embodiment of the present invention.

FIG. 10 is a flowchart 100 illustrating a method of providing data access control over a network in accordance with one embodiment of the present invention. At block 1002, the process couples a control device to a digital processing system. In one aspect, the control device is a SAKE device, which includes a USB connector, MCU, flash memory and biometric sensor. The USB connector is used to directly connect to a USB port of the digital processing system, which acts as a host system of the SAKE device. The process proceeds to block 1004.

At block 1004, the biometric sensor detects the user's biometric information and forwards the detected biometric information to a biometric verification unit. The biometric verification unit authenticates the detected biometric information against a biometric template stored in the internal memory. When the user's identity is authenticated, which means the biometric information such as fingerprint matches with the biometric template, the process moves to block 1006.

At block 1006, the process retrieves initialization information from the internal memory. In one embodiment, the initialization information includes a security code and a public key. The security code, which may vary between ISPs, is used to establish an initial communication between the SAKE device and the ISP. The process proceeds to block 1008.

At block 1008, the process forwards the security code to an associated ISP and request to establish communication. Once the communication is formed, the public key is forwarded to the ISP to confirm that the true user is communicating with the ISP. The process moves to block 1010.

At block 1010, a communication between the SAKE device and the ISP is established and ISP is ready to perform user's request. The process moves to block 1012.

At block 1012, the SAKE device receives requested information such as a copy of a digital book or a movie. When the requested information is encrypted, the process moves to block 1014.

At block 1014, the process stores the encrypted data in the flash memory of the SAKE device. The process moves to the next block.

Figure 11:
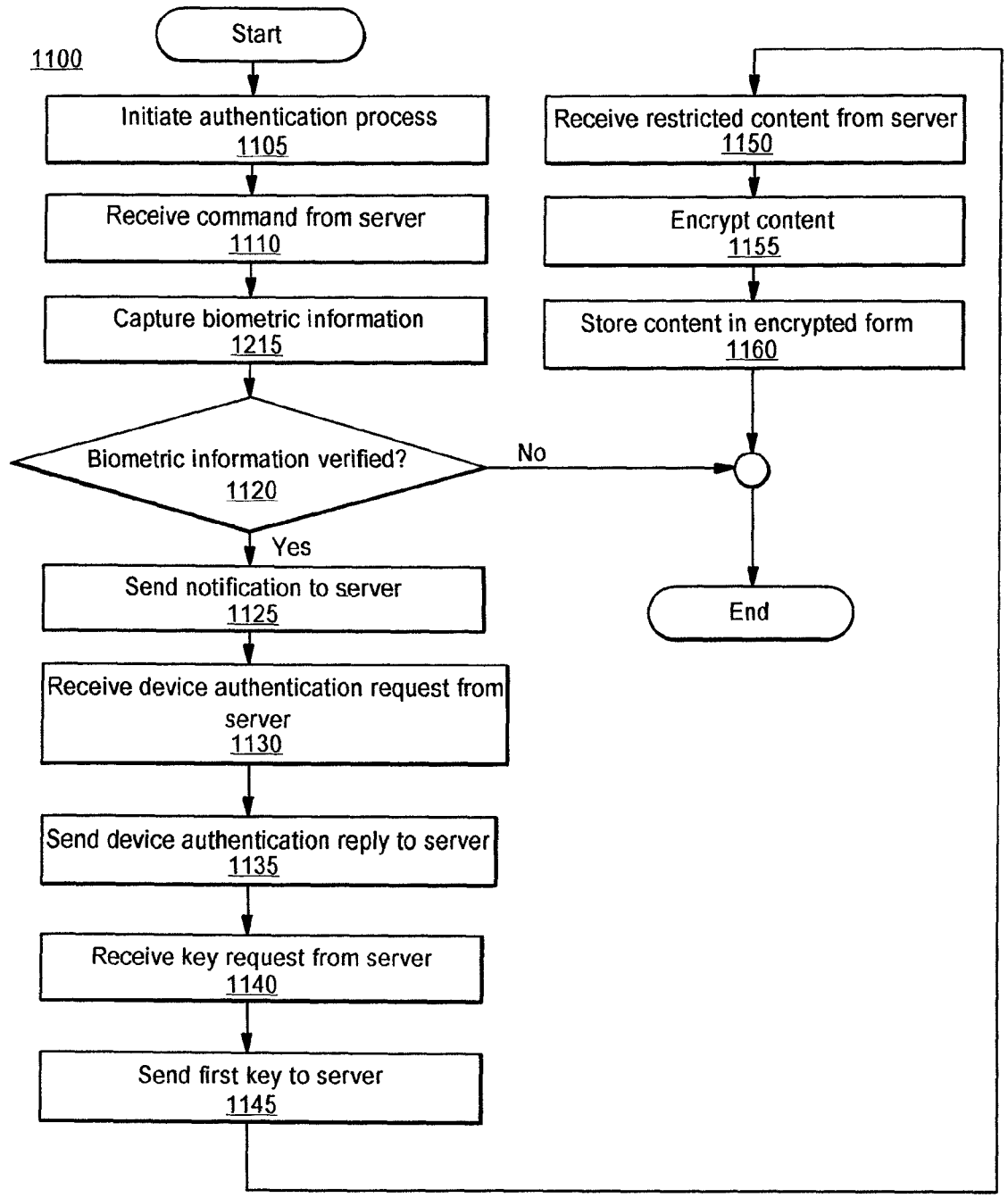
FIG. 11 is a flowchart showing various steps of an embodiment of the authentication method of the present invention.

FIG. 11 is a flow diagram showing various steps of an embodiment of the authentication method of the present invention. In a currently preferred embodiment, a user requests and downloads restricted content into a SAKE device assigned to that user from a content server using the authentication process as described below with reference to FIG. 11. As described above, the restricted content can be any of a wide variety of information, such as copyrighted materials (e.g., newspapers, books, magazines, music, movies, software, games, etc.), confidential records (e.g., medical, financial), proprietary business information (e.g., personnel files, technical designs, client contacts, etc.), contents that require payment or age verification before access is granted, and any other information requiring access control.

In step 1105, to initiate the authentication process, a user accesses a login web page of a content provider utilizing an embodiment of the authentication method of the present invention. Typically, the user navigates the Web using common Internet browser software (e.g., Microsoft Internet Explorer™) installed on a client computer connected to the Internet. To access the designated login page, the user enters the web page address (e.g., URL address) of the login page or clicks on a hyperlink or bookmark pointing to that address. Depending on the particular application, the client computer can be a desktop computer, a laptop computer, a personal digital assistant (PDA), a point-of-sale (POS) terminal, a television, a gaming console, a networked kiosk, or any other network-enabled device that allows the user to interact with the content server. In one embodiment, the login page is stored on a content server and is programmed to include a "Login" button or link which, when clicked, causes the content server to generate a command that initiates the authentication process. Accordingly, the user clicks on the "Login" button to start the authentication process.

In step 1110, the SAKE device, which in one embodiment comprises a USB plug that is plugged into a USB port of the client computer, receives the command from the content server. This command establishes communication between the content server and the SAKE device. The command also serves to notify the SAKE device that the content server is ready to receive information pertaining to the authentication process from the SAKE device.

In step 1115, the SAKE device captures biometric information from the user via a biometric detector that is built into the SAKE device. In a currently preferred embodiment, the biometric detector is a built-in fingerprint sensor on an upwardly-facing surface of the SAKE device. When the user places his/her thumb on the sensor, the thumbprint is captured for verification by the SAKE device, as described in step 1120 immediately below. While fingerprinting is described herein as an identity authentication technique, it is appreciated that other biometric-based techniques, such as iris-scan, can also be used in accordance with the present invention.

In step 1120, the captured biometric information is verified against stored biometric template(s) of one or more authorized user(s). In one embodiment, when the SAKE device is assigned to an authorized user, the fingerprint of that authorized user is captured and stored into the SAKE device as a fingerprint template. In an embodiment where multiple authorized users are supported, a separate template is created and stored for each authorized user. Thereafter, when a person wants to access restricted contents on a server for which the SAKE device is assigned, that person's fingerprint can be verified by a fingerprint verification engine in the SAKE device against the stored fingerprint template(s) of the authorized user(s).

If in step 1120 it is determined that the captured biometric information (e.g., fingerprint) matches the stored biometric template (or one of the templates in the case of multiple authorized users), then in step 1125, the SAKE device transmits a notification to the content server, indicating to the server that the current user's identity has been authenticated biometrically.

In step 1130, the SAKE device receives a device authentication request from the content server. In a preferred embodiment, the content server transmits a device authentication request to the SAKE device upon receiving the notification of user identity authentication from the SAKE device as described in step 1125 above.

In step 1135, the SAKE device transmits a device authentication reply to the content server in response to the device authentication request described in step 1130 above. Significantly, the device authentication reply allows the SAKE device and the content server to complete an authentication handshake. The SAKE device is programmed to generate a device authentication reply that is characteristics of and is recognizable by the particular content server. Therefore, the reply enables the server to verify that the SAKE device is properly assigned to the user for accessing restricted content on the server. In accordance with a preferred embodiment, the device authentication reply includes multiple authentication sequences, with each sequence being transmitted to the server separately. For example, after transmitting a first authentication sequence, the SAKE device can wait for a confirmation sequence from the server before transmitting the next sequence itself. Any number of sequences can be used in the authentication handshake, allowing for flexibility in customization. In a preferred embodiment, different content servers have different authentication handshakes with their corresponding SAKE devices, so that a given SAKE device assigned for a particular content server will be of no use in accessing restricted content on another content server.

In step 1140, the SAKE device receives a key request from the content server. In a preferred embodiment, the content server transmits a key request to the SAKE device when the authentication handshake described above in step 1135 is completed. In other words, when the content server has ascertained that the request for restricted content originates from a legitimate SAKE device properly assigned for that purpose, the server sends a key request to the SAKE device.

In step 1145, the SAKE device transmits a first key representative of the user's identity to the content server in response to the key request described in step 1140 above. This first key enables the server to confirm the user's identity. In a preferred embodiment, the first key is a public key (e.g., as used under the Public Key Infrastructure, or PKI) that uniquely identifies the key holder to third parties, such as the content server in this case. In one embodiment, the public key is hashed using a secure hashing algorithm, preferably stored in a non-volatile solid-state memory, before transmission to the content server. It is appreciated that according to the present invention, the key verification can be performed by the content server itself or by a certifying authority ("CA") on behalf of the content server.

In step 1150, the SAKE device receives the restricted content from the content server as requested. In one embodiment, the restricted content is received by the SAKE device as one or more data streams. In other words, the content is transmitted from the content server to the SAKE device by streaming.

It should be appreciated that according to a preferred embodiment described above, the content server only sends the restricted content to the SAKE device after a successful biometric authentication of the user's identity, a successful authentication handshake between the content server and the SAKE device, and a successful verification of the user's identity using a unique key such as a public key. The tri-level authentication process of the present invention as described provides very strong security protection against unauthorized access of restricted content stored on the content server.

In step 1155, the SAKE device encrypts the content received from the content server. In a preferred embodiment, the encryption is performed using a second key representative of the user's identity. In one embodiment, the second key is a private key assigned to the user.

In step 1160, the SAKE device stores the encrypted content in its memory. The stored content is secured against unauthorized access because it is in encrypted form and cannot be decrypted without the second key (e.g., private key) described above in step 1155. In one embodiment, the encrypted content is stored in a non-volatile solid-state memory.

In a preferred embodiment, the SAKE device includes one or more of a voltage detector, a frequency detector, and a temperature detector (e.g., thermometer, thermostat) to further protect the stored information against tampering. These detectors monitor the operation parameters of voltage, frequency, and temperature. It is appreciated that common hacking techniques involve altering the voltage, frequency, and/or temperature of the environment in which a storage device operates in an attempt to gain unauthorized access to the stored data. Thus, according to this embodiment, when the detectors detect that one or more of the operation parameters fall beyond their normal operating ranges as specified, the SAKE device erases or otherwise destroys the encrypted data stored therein, and optionally the first key, the second key, and the biometric template. This data self-destruction feature provides a last line of defense against unauthorized access of the restricted content stored in the SAKE device.

Importantly, content received from the content server goes directly to the SAKE device and is not stored on the client computer in any form. The internet browser serves as a conduit of data transfer between the content server and the SAKE device. The data transfer is transparent to the user and the content is neither displayed to the user in the browser, nor is the content allowed to be stored on the client computer using the browser interface. In a preferred embodiment, data is transferred by streaming, which provides additional protection against hacking, as portions of a data stream cannot be meaningfully reassembled in case of malicious interception. In one embodiment, encrypted content received from the server is decrypted by the browser (using standard decryption protocols such as DES, AES, 3-DS) and then encrypted by the SAKE device using a private key before storing. In another embodiment, the encrypted content is passed as is to the SAKE device, which can perform additional decryption and/or re-encryption. The restricted content is stored within the SAKE device in encrypted form and cannot be replicated to another storage medium connected to the client computer. Moreover, retrieval of the data is only allowed when the user's identity is authenticated through the biometric detector and verification engine.

Once the content is securely stored in the SAKE device, an authorized user can gain access to the content by a successfully passing the biometric authentication, thereby causing the SAKE device to decrypt the stored content and streaming it to the appropriate application program for processing. For example, a music file or a movie file is decrypted and streamed to a media player for playback. An executable file is decrypted and then run from the SAKE device. A document is decrypted for viewing by a viewer/word processing program straight from the SAKE device. Thus, the content remains in the SAKE device and the streaming of the data is under the control of the SAKE device so that unauthorized access is prevented. In another embodiment, the encrypted content is streamed for processing by the appropriate application program without being decrypted. In this embodiment, a customized application program capable of processing the encrypted content is provided.

In the foregoing specification the invention has been described with reference to specific exemplary embodiments thereof. It will, however, be evident that various modifications and changes may be made thereto without departing from the broader scope of the invention. The specification and drawings are, accordingly, to be regarded in an illustrative rather than restrictive sense.

What is claimed is:

1. A method comprising:
   establishing communication via a Universal Serial Bus (USB) plug of a portable device with a host computer when the USB plug is directly connected to a USB port of the host computer;
   performing a user authentication of a user of the portable device, the user authentication being performed by the portable device;
   if the user authentication is successful, sending information from the portable device to a content server via the host computer for performance of an authentication handshake between the portable device and the content server;
   if the authentication handshake is successful, sending an encrypted first key from the portable device to the content server via the host computer for performance of a second user authentication by the content server; and
   if the second user authentication is successful, the portable device receiving restricted content from the content server via the host computer.

2. The method of claim 1, wherein the user authentication is a biometrics-based user authentication.

3. The method of claim 2, wherein the biometrics-based user authentication compares a user's detected fingerprint to a fingerprint template stored in the portable device.

4. The method of claim 2, wherein the biometrics-based user authentication compares a user's detected iris pattern to an iris pattern stored in the portable device.

5. The method of claim 1, wherein the encrypted first key is an encrypted public key.

6. The method of claim 1, further comprising encrypting a first key.

7. The method of claim 1, further comprising storing the restricted content in a non-volatile memory of the portable device.

8. The method of claim 1, further comprising encrypting the restricted content using a second key and storing the encrypted restricted content in a non-volatile memory of the portable device.

9. A method comprising:
   establishing communication via a Universal Serial Bus (USB) plug of a portable device with a host computer when the USB plug is directly connected to a USB port of the host computer;
   performing a user authentication of a user of a portable device, the user authentication being performed by the portable device;
   if the user authentication is successful, sending information from the portable device to a content server via a host computer for performance of an authentication handshake between the portable device and the content server;
   if the authentication handshake is successful, sending a hashed first key from the portable device to the content server for performance of a second user authentication by the content server; and
   if the second user authentication is successful, the portable device receiving restricted content from the content server via the host computer.

10. The method of claim 9, wherein the user authentication is a biometrics-based user authentication.

11. The method of claim 10, wherein the biometrics-based user authentication compares a user's detected fingerprint to a fingerprint template stored in the portable device.

12. The method of claim 10, wherein the biometrics-based user authentication compares a user's detected iris pattern to an iris pattern stored in the portable device.

13. The method of claim 9, wherein the hashed first key is a hashed public key.

14. The method of claim 9, further comprising hashing a first key.

15. The method of claim 9, further comprising storing the restricted content in a non-volatile memory of the portable device.

16. The method of claim 9, further comprising encrypting the restricted content using a second key and storing the encrypted restricted content in a non-volatile memory of the portable device.

17. A method comprising:
   establishing communication via a Universal Serial Bus (USB) plug of a portable device with a host computer when the USB plug is directly connected to a USB port of the host computer;
   executing a user authentication process of a user of the portable device;
   sending a security code from the portable device to a content server via a host computer in response to a request from the content server;
   sending a hashed first key from the portable device to the content server via the host computer for performance of a user authentication by the content server; and
   the portable device receiving restricted content from the content server via the host computer if the user authentication by the content server is successful.

18. The method of claim 17, wherein the user authentication process is a biometrics-based user authentication process.

19. The method of claim 18, wherein the biometrics-based user authentication process compares a user's detected fingerprint to a fingerprint template stored in the portable device.

20. The method of claim 18, wherein the biometrics-based user authentication process compares a user's detected iris pattern to an iris pattern stored in the portable device.

21. The method of claim 17, wherein the hashed first key is a hashed public key.

22. The method of claim 17, further comprising hashing a first key.

23. The method of claim 17, further comprising storing the restricted content in a non-volatile memory of the portable device.

24. The method of claim 17, further comprising encrypting the restricted content using a second key and storing the encrypted restricted content in a non-volatile memory of the portable device.

25. A portable device comprising:
   a processor;
   a non-volatile memory coupled to the processor;
   a Universal Serial Bus (USB) plug coupled to a USB controller that is coupled to the processor, the USB plug configured to directly connect the portable device to a USB port of a host computer;
   a user authentication algorithm configured to authenticate a user of the portable device;
   the processor configured to perform an authentication handshake with a content server via the host computer if the user authentication algorithm indicates a successful user authentication; and
   a hashing algorithm configured to hash a public key before the processor sends the public key to the content server via the host computer for performance of a user authentication by the content server;

the processor further configured to store in the non-volatile memory content received from the content server via the host computer if the user authentication by the content server is successful.

26. The portable device of claim 25, further comprising an encryption unit configured to encrypt content received from the content server via the host computer, and wherein the processor is further configured to store the encrypted content in the non-volatile memory.

27. The portable device of claim 26, wherein the encryption unit is configured to encrypt the content using a private key.

28. The portable device of claim 25, further comprising a tamper-proof unit configured to erase at least a portion of data stored in the non-volatile memory upon detecting at least one operation parameter falling beyond a predetermined normal operating range.

29. The portable device of claim 25, wherein the public key is stored in the non-volatile memory.

30. A portable device comprising:
a processor;
a non-volatile memory coupled to the processor;
a Universal Serial Bus (USB) plug coupled to a USB controller that is coupled to the processor, the USB plug configured to directly connect the portable device to a USB port of a host computer;
a user authentication algorithm configured to authenticate a user of the portable device;
the processor configured to send a security code to a content server via the host computer if the user authentication algorithm indicates a successful user authentication; and
a hashing algorithm configured to hash a public key before the processor sends the public key to the content server via the host computer for performance of a user authentication by the content server,
the processor further configured to store in the non-volatile memory content received from the content server via the host computer if the user authentication by the content server is successful.

31. The portable device of claim 30, further comprising an encryption unit configured to encrypt content received from the content server via the host computer, and wherein the processor is further configured to store the encrypted content in the non-volatile memory.

32. The portable device of claim 31, wherein the encryption unit is configured to encrypt the content using a private key.

33. The portable device of claim 30, further comprising a tamper-proof unit configured to erase at least a portion of data stored in the non-volatile memory upon detecting at least one operation parameter falling beyond a predetermined normal operating range.

34. The portable device of claim 30, wherein the public key is stored in the non-volatile memory.

* * * * *